Patented Aug. 29, 1933

1,924,765

UNITED STATES PATENT OFFICE 1,924,765

PREPARATION OF CARBOXYLIC ACIDS FROM OLEFINIC HYDROCARBONS, CARBON MONOXIDE, AND STEAM

Alfred T. Larson and Walter E. Vail, Wilmington Del., assignors to E. I. du Pont de Nemours & Company, Wilmington, Del., a corporation of Delaware No Drawing. Application November 25, 1931
Serial No. 577,392

10 Claims. (Cl. 260—116)

This invention relates to the synthesis of organic compounds and particularly to the preparation of aliphatic carboxylic acids by the interaction of olefines, carbon monoxide, and steam.

Aliphatic acids of the higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

In the copending application of Gilbert B. Carpenter Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a catalyst. Another object of the invention is to provide a process for the preparation of acids having the structural formula—

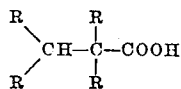

from steam, carbon monoxide, and an olefinic hydrocarbon, the R indicating hydrogen or a substituted or unsubstituted similar or dissimilar alkyl or aralkyl grouping. Other objects and advantages will hereinafter appear.

We have found that aliphatic carboxylic acids can be prepared from steam, carbon monoxide, and an olefinic hydrocarbon by passing these constituents, in the presence of an ammonium halide, under suitable pressure and temperature conditions, over active carbon, and more particularly over activated charcoal. The products resulting from such a reaction, will contain generally a mixture of aliphatic carboxylic acids some of which have a greater, some a lesser, number of carbon atoms than are present in the olefine treated,—an aliphatic acid containing one more carbon atom than the olefine, usually predominating.

The ammonium halides which are suitable for use in our process include ammonium chloride, ammonium bromide, ammonium iodide or in fact any compound which acts similarly to the ammonium halide.

The ammonium halide may be added to the gases in various ways. For example, the concentration desired is determined and such an amount of the halide is dissolved in the water to be used in the reaction, as steam, that upon injection the predetermined concentration is attained. Other means of adding the ammonium halide may be used such, for instance, as adding anhydrous ammonia and a hydrogen halide directly to the gaseous stream, spraying an aqueous solution of an ammonium halide into the gaseous stream just prior to the reaction, or any other means may be employed many of which will readily suggest themselves to the expert in this art. The halide is preferably added to the gaseous stream prior to the reaction, but it may be added in portions during the progress thereof.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practising the invention, although the invention is not limited to the examples.

*Example 1.*—A gaseous mixture was prepared containing by volume 95% carbon monoxide, and 5% ethylene, together with steam to give a steam: carbon monoxide and ethylene ratio of approximately 0.25, the steam being derived from the injection of an appropriate amount of a 1% aqueous solution of ammonium chloride to give this steam:gas ratio. The resulting gaseous mixture was passed into a conversion chamber designed for carrying out exothermic gaseous reactions and in which activated charcoal was disposed. The temperature of the reaction was maintained at approximately 325° C. while the pressure was held at approximately 700 atmospheres. A 75% yield of propionic acid was obtained together with other aliphatic acids.

*Example 2.*—In lieu of injecting ammonium chloride into the reaction a 1% aqueous solution of ammonium iodide was injected to give the same steam:gas ratio of 0.25. Gas compositions, pressure, and temperature conditions were substantially equivalent to those employed in Example 1. A 65% yield of propionic acid was obtained together with other aliphatic acids.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method hereinbefore described without departing from the invention or sacrificing the advantages thereof.

We claim:

1. A process for the preparation of aliphatic carboxylic acids from steam, carbon monoxide, and an olefinic hydrocarbon which includes the step of effecting the reaction in the presence of an ammonium halide, and active carbon.

2. A process for the preparation of aliphatic carboxylic acids from a gaseous mixture containing steam, carbon monoxide, and an olefinic hydrocarbon which comprises passing the gaseous mixture together with an ammonium halide over active carbon.

3. A process for the preparation of aliphatic carboxylic acids from a gaseous mixture containing steam, carbon monoxide, and an olefinic hydrocarbon which comprises passing the gaseous mixture together with an ammonium halide over activated charcoal.

4. A process for the preparation of aliphatic carboxylic acids from steam, carbon monoxide, and an olefinic hydrocarbon which includes the step of effecting the reaction in the presence of ammonium chloride and activated charcoal.

5. A process for the preparation of aliphatic carboxylic acids from a gaseous mixture containing steam, carbon monoxide, and an olefinic hydrocarbon which comprises passing the gaseous mixture together with ammonium chloride over activated charcoal.

6. A process for the preparation of propionic acid from a gaseous mixture containing steam, carbon monoxide, and ethylene which comprises passing the gaseous mixture together with ammonium chloride over activated charcoal.

7. A process for the preparation of propionic acid from a gaseous mixture containing steam, carbon monoxide, and ethylene which comprises passing the gaseous mixture together with ammonium iodide over activated charcoal.

8. A process for the preparation of propionic acid from a gaseous mixture containing steam, carbon monoxide, and ethylene which comprises passing the gaseous mixture together with ammonium bromide over activated charcoal.

9. In a process for the preparation of aliphatic carboxylic acids at a temperature of approximately 325° C. and a pressure of approximately 700 atmospheres by the interaction of a gaseous reaction mixture comprising approximately 72% carbon monoxide, 3% of an olefinic hydrocarbon, and 25% steam, the step which comprises effecting the reaction in the presence of an ammonium halide catalyst and activated charcoal.

10. In a process for the preparation of propionic acid at a temperature of approximately 325° C. and a pressure of approximately 700 atmospheres by the interaction of a gaseous mixture containing approximately 72% carbon monoxide, 3% ethylene, and 25% steam, the step which comprises effecting the reaction in the presence of approximately 1% of an aqueous solution of ammonium chloride.

ALFRED T. LARSON.
WALTER E. VAIL.